United States Patent [19]

Taylor, III et al.

[11] Patent Number: 5,004,286
[45] Date of Patent: Apr. 2, 1991

[54] TRANSPORT VEHICLE PROTECTIVE SHIELD

[76] Inventors: Sylvester R. Taylor, III; Joann Taylor, both of 2288 S. Holly, Fresno, Calif. 93706

[21] Appl. No.: 408,668

[22] Filed: Sep. 18, 1989

[51] Int. Cl.⁵ .................... B60R 27/00; B62D 47/02; B62D 33/06
[52] U.S. Cl. ....................................... 296/24.1; 109/9
[58] Field of Search ...................... 296/24.1, 178, 190; 49/169, 170; 109/9, 11, 16

[56] References Cited

U.S. PATENT DOCUMENTS

| | | | |
|---|---|---|---|
| 2,574,585 | 11/1951 | Nielsen | 296/24.1 |
| 3,866,242 | 2/1975 | Slagel | 296/78.1 X |
| 4,227,735 | 10/1980 | Joyner | 296/24.1 |
| 4,381,716 | 5/1983 | Hastings et al. | 109/11 X |
| 4,509,788 | 4/1985 | Jan et al. | 296/24.1 |
| 4,595,227 | 6/1986 | Setina | 296/24.1 |
| 4,621,856 | 11/1986 | McKenzie | 296/24.1 |
| 4,666,204 | 5/1987 | Reinholtz | 296/24.1 |

*Primary Examiner*—Margaret A. Focarino
*Assistant Examiner*—Andrew C. Pike
*Attorney, Agent, or Firm*—Leon Gilden

[57] ABSTRACT

A transport vehicle protective shield is set forth formed of a transparent, multi-layered, bullet-proof paneling including a first panel orthogonally mounted to a second panel to enclose a passenger compartment of a transport vehicle, such as a bus. The second panel includes a displacement door hingedly mounted to a first door of the second panel to provide access for a coin receiving appliance traditionally positioned adjacent the passenger compartment in bus vehicles. The panels include ventilation apertures to cooperate with a ventilation duct work within the passenger compartment to provide comfort and convenience in its use.

6 Claims, 1 Drawing Sheet

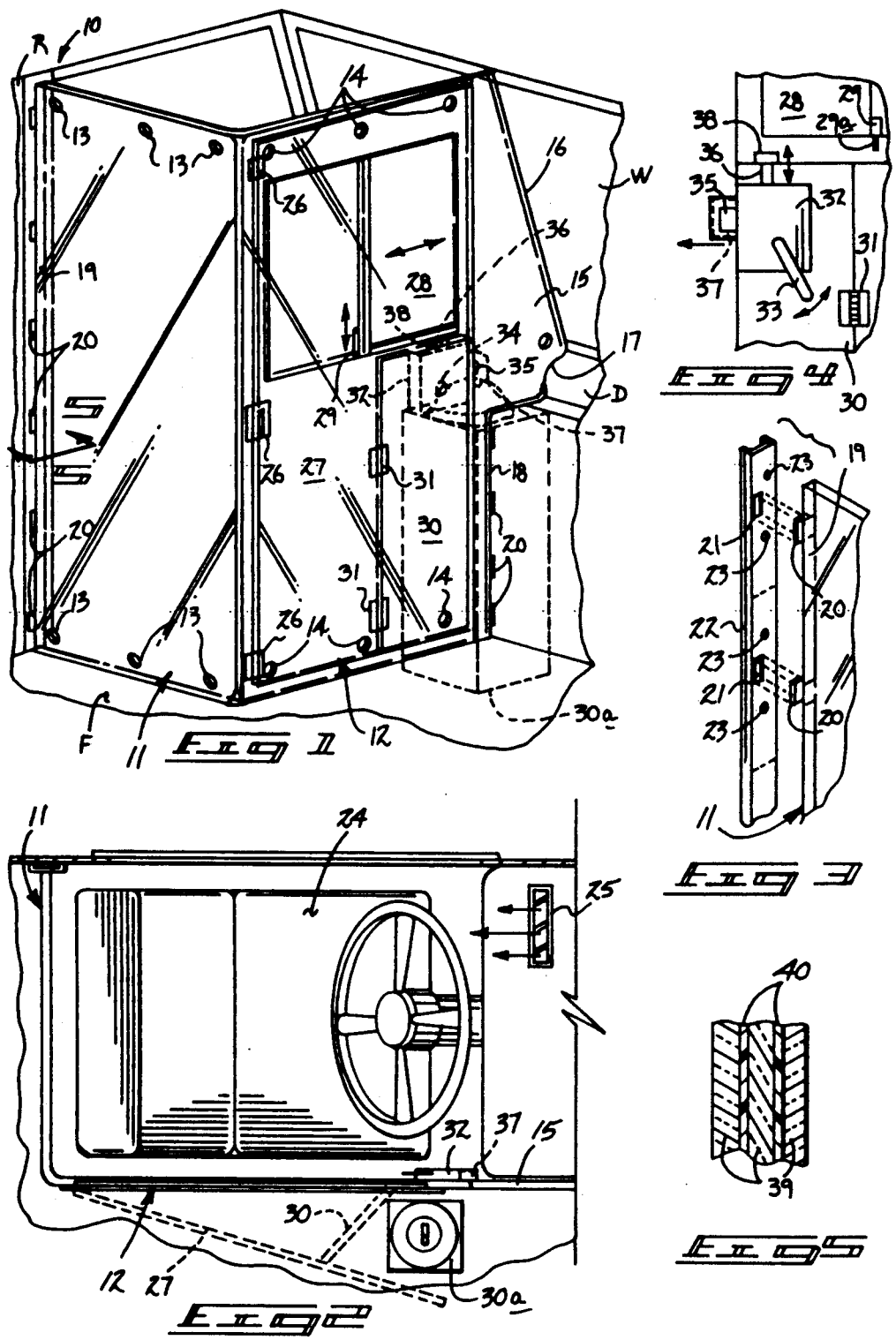

TRANSPORT VEHICLE PROTECTIVE SHIELD

BACKGROUND OF THE INVENTION

1. Field of the Invention

The field of invention relates to protective shields, and more particularly pertains to a new and improved transport vehicle protective shield wherein the same is retrofitted to transport vehicles for the protection and security of drivers within driving compartments of the vehicles.

2. Description of the Prior Art

Protective shields, and particularly penetration resistant shields, are known in the prior art for application in particular environments requiring protection for individuals as a guard against the increasing incidents of crime, particularly in urban areas where commercial transport vehicles are widely used. Drivers of such vehicles have been increasingly subjected to incidents of violence, and accordingly a need has developed to afford a level of protection to such drivers in these environments. Examples of the prior art providing protective shields for various situations is exemplified in U.S. Pat. No. 4,331,359 to Sheldon providing window shields formed of penetration resistant material positioned exteriorly adjacent a standard window of a self-propelled vehicle. The shields are spaced from and received within standard vehicular glass channels that may be motivated by electric motors during periods of need.

U.S. Pat. No. 3,369,836 to Haycock et al. sets forth a removable protective shield for use with motorcycles wherein an accessory shield is securable to the exterior surface of the motorcycle shield for protection of an individual during use of the motorcycle.

U.S. Pat. No. 4,412,495 to Sankar sets forth a body shield made of bullet-proof type material for support by an individual provided with a window portion within the shield.

U.S. Pat. No. 3,866,242 to Slagel sets forth a protective shield in the contour of a clip board, windshield for a vehicle, and a face shield for a helmet to be utilized by an individual for protection thereof.

U.S. Pat. No. 3,855,898 to McDonald sets forth a protective panel construction for windows of a self-propelled vehicle including fabric strap members and the like for securement of the panels to a windshield.

As such, it may be appreciated that there is a continuing need for a new and improved transport vehicle protective shield arranged for use in combination with a driving compartment of a commercial transport vehicle for protection of the vehicle's driver during use of the vehicle, and as such, the instant invention substantially fulfills this need.

SUMMARY OF THE INVENTION

In view of the known types of protective shields now present in the prior art, the present invention provides a transport vehicle protective shield wherein the same is securable in a surrounding relationship relative to a driver's compartment of a transport vehicle for protection of the driver therewithin.

To attain this, the present invention includes a generally "L" shaped protective shield defined by a first panel orthogonally mounted to a second panel, wherein the second panel includes a door hingedly mounted to the panel. The door includes a displacement door therewithin mounted to the second door by spring hinges to enable displacement of the door to accommodate a corner seating appliance utilized in combinatin with the vehicle. The protective shield includes ventilation apertures and a sliding window to provide selective access interiorly of the shield by the driver. A double latch arrangement enables unlatching of the second panel door, as well as the displacement door in use. The shield is made of a multi-laminated polyurethane penetration resistant material with polymeric film therebetween the polyurethane sheets prepared in a manner as indicated in U.S. Pat. No. 3,866,242 incorporated herein by reference.

Our invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is another object of the present invention to provide a new and improved transport vehicle protective shield which may be easily and efficiently manufactured and marketed.

It is a further object of the present invention to provide a new and improved transport vehicle protective shield which is of a durable and reliable construction.

An even further object of the present invention is to provide a new and improved transport vehicle protective shield which is susceptible of a low cost of manufacture with regard to both materials and labor, and which accordingly is then susceptible of low prices of sale to the consuming public, thereby making such transport vehicle protective shield economically available to the buying public.

Still another object of the present invention is to provide a new and improved transport vehicle protective shield capable of retrofit to available transport vehicles to afford protection of occupant drivers therewithin.

These together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is a top orthographic view of the instant invention in position about a driver compartment of a transport vehicle.

FIG. 3 is an isometric illustration of the securement of the shield to the transport vehicle by use of securement latch members.

FIG. 4 is an orthographic view taken in elevation interiorly of the second panel of the shield to illustrate the functioning of the latch member.

FIG. 5 is an orthographic cross-sectional view taken along the lines 5—5 of FIG. 1 in the direction indicated by the arrows.

DESCRIPTION OF THE PREFERRED EMBODIMENT

With reference now to the drawings, and in particular to FIGS. 1 to 5 thereof, a new and improved transport vehicle protective shield embodying the principles and concepts of the present invention and generally designated by the reference numeral 10 will be described.

More specifically, the transport vehicle protective shield 10 essentially comprises a generally "L" shaped shield including a first planar transport panel 11 of a generally rectangular configuration orthogonally and integrally secured to a second planar transport panel 12 of a like configuration. A third "L" shaped planar panel 15 is coextensively and integrally mounted to a forward edge of the second panel 12 and includes a first free edge 16 of a length substantially equal to a height of the associated height of windshield "W" of the transport vehicle, wherein the first edge 16 extends into a second arcuate edge 17 overlying the dashboard panel and an "L" shaped edge 18 to conform to an associated dashboard surface "D" of the transport vehicle. The first and second planar panels each include a series of ventilation apertures including first ventilation apertures 13 and second ventilation apertures 14 respectively, wherein the ventilation apertures are formed in a series adjacent upper and lower edges of the respective panels 11 and 12. It should be noted that the first panel 11, and the second panel 12, as well as the third panel 15, are of a predetermined height substantially equal to that of a height defined by a floor portion "F" extending to a roof portion "R" of the transport vehicle. In summary, the transport vehicle driver compartment 24 is bounded by a side wall extending to the forward windshield with a dashboard panel underlying the windshield extending to the floor and the compartment is defined by an overlying roof defining a predetermined distance between the roof and the floor.

The first planar panel 11 includes an elongate vertical first panel edge 19 formed with outwardly extending plate members 20 to interfit within slots 21 of a securement strip 22. The securement strip 22 is of a length equal to that of the first panel edge 19 and is formed with offset apertures 23 for securement to an interior wall surface of the transport vehicle. The driver compartment 24, as illustrated in FIG. 2, is formed with a ventilation duct 25 to cooperate with respective first and second ventilation apertures 13 and 14.

A second panel door 27 is hingedly mounted utilizing hinges 26 adjacent the intersection of the first and second panels 11 and 12 to enable opening of the door exteriorly of the driver compartment 24 and is formed with a sliding window 28 that includes a sliding window latch 29 including an extending locking boss 29a that is receivable within a recess within a window frame of the window 28 to enable selective securement of the window 28 by a driver within the compartment 24.

The second panel door 27 includes a second panel displacement door 30 mounted within a lowermost corner of the second panel door remote from the hinges 26. The displacement door 30 includes spring hinges 31 mounted on the displacement door 30 and the second panel door 27 to bias the displacement door 30 into an aligned position relative to the second panel door 27. Reference to FIG. 4 illustrates a pivoted latch handle 33 aligned with a key lock 34, each mounted in a latch member 32 mounted to the displacement door, wherein a first and second respective latch bolt 35 and 36 are mounted for reciprocation vertically and horizontally, respectively, from the latch member 32 for reception within respective latch plates 37 and 38 to simultaneously latch the second panel door 27 to the second panel 12 and latch the displacement door 30 to the second panel door 27. The displacement door 30 is required so that whereupon opening of the second panel door 27, the displacement door 30 is biased and displaced from a plane of the second panel door 27 to accommodate a coin receiving appliance 30a mounted adjacent the displacement door 30 to enable opening of the second panel door 27. Accordingly the coin appliance is of a height less than that defined by the displacement door and is mounted adjacent the displacement door.

FIG. 5 illustrates the construction of the protective shield 10 and the associated panels including a series of three coextensive laminated polyurethane sheets 39 formed of a penetration resistant construction, as discussed in U.S. Pat. No. 3,866,242 incorporated herein by reference. Each of the sheets 39 include a single transparent polymeric membrane 40 therebetween and sandwiched between the transparent polyurethane sheets 39 to maintain the geometric integrity and structure of the protective shield 10 upon impact by projectiles to further enhance the protection afforded a driver within the driver compartment 24.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, and assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes to the invention will readily occur to those skilled in the art, it is not desired to limit the invention to the exact construction and operation shown and described. Accordingly, all suitable modifications and equivalents may be resorted to, falling within the scope of the invention.

What is claimed as being new and desired to be protected by Letters Patent of the United States is as follows:

1. A transport vehicle protective shield in combination with a transport vehicle, wherein the vehicle includes a driver compartment, and a coin-receiving appliance mounted vertically, relative to a floor portion of the vehicle, adjacent the driver compartment, the compartment bounded by a side wall extending to a forward windshield with a dashboard panel underlying the windshield extending to the floor and the compartment defined by an overlying roof defining a predetermined distance between the roof and the floor, the shield comprising a first transport panel integrally and orthogonally secured to a second transparent panel to define an "L" shaped shield, and a third panel coextensively and integrally mounted to a forward vertical edge of the second panel, and the second panel including a door member hingedly mounted to the second panel, and a latch means mounted to secure the door member to the second panel, and the first panel mounted to the side wall and the third panel mounted to the dashboard panel to enclose the driver compartment, and wherein the first panel, and the second panel, and the third panel are each of a vertical height equal to the predetermined distance, and wherein the door member includes a window slidably mounted within the second panel, the window including a latch to secure the window in a closed orientation relative to the door member, and further including a displacement door hingedly mounted to the door member, the displacement door mounted within a lowermost corner of the door member and remote from a series of hinges mounting the door member to the second panel.

2. A transport vehicle protective shield as set forth in claim 1 wherein the latch means is mounted to the displacement door and includes a first bolt and second bolt, the first bolt latching the displacement door to the door member, and the second bolt latching the displacement door to the second panel, wherein the first bolt and second bolt are reciprocatably mounted within the latch means.

3. A transport vehicle protective shield as set forth in claim 2 wherein the first panel and the second panel each include a series of ventilation apertures positioned adjacent upper and lowermost edges of the respective first and second panels.

4. A transport vehicle protective shield as set forth in claim 3 wherein the driver compartment includes a ventilation duct therewithin to cooperate with the ventilation apertures.

5. A transport vehicle protective shield as set forth in claim 4 wherein the coin receiving appliance is of a height less than that defined by the displacement door and is mounted adjacent the displacement door, whereupon opening of the door panel displaces the displacement door relative to the door panel.

6. A transport vehicle protective shield as set forth in claim 5 wherein the displacement door includes spring-biased hinges to normally bias the displacement door in a plane defined by the door member.

* * * * *